(12) United States Patent
Blockley et al.

(10) Patent No.: US 8,882,631 B2
(45) Date of Patent: Nov. 11, 2014

(54) GEAR BOX, SEAL, AND COVER ARRANGEMENTS

(75) Inventors: Christopher James Blockley, Nottingham (GB); David John Scott, Nottingham (GB); Paul James Gibbs, Nottingham (GB); Siu Yun Poon, Nottingham (GB); Ketan Chandrakant Paua, Pune (IN)

(73) Assignee: Romax Technology Limited, Nottingham (GB)

( * ) Notice: Subject to any disclaimer, the term of this patent is extended or adjusted under 35 U.S.C. 154(b) by 0 days.

(21) Appl. No.: 13/419,595

(22) Filed: Mar. 14, 2012

(65) Prior Publication Data

US 2012/0238402 A1 Sep. 20, 2012

(30) Foreign Application Priority Data

Mar. 16, 2011 (GB) ................................ GB1104455.9
Apr. 4, 2011 (GB) ................................ GB1105650.4
May 3, 2011 (GB) ................................ GB1107316.0

(51) Int. Cl.
*F16H 57/08* (2006.01)
*F03D 11/02* (2006.01)
*F03D 11/00* (2006.01)
*F16H 1/46* (2006.01)

(52) U.S. Cl.
CPC ........... *F03D 11/0008* (2013.01); *Y02E 10/722* (2013.01); *F03D 11/02* (2013.01); *F16H 1/46* (2013.01); *F05B 2240/50* (2013.01); *F05B 2260/40311* (2013.01)
USPC ........... 475/331; 475/337; 475/348; 74/606 R

(58) Field of Classification Search
USPC ......................... 475/331, 337, 348; 74/606 R
See application file for complete search history.

(56) References Cited

U.S. PATENT DOCUMENTS

| | | | |
|---|---|---|---|
| 7,828,682 B2* | 11/2010 | Smook ........................... | 475/331 |
| 2006/0104815 A1* | 5/2006 | Siegfriedsen .............. | 416/170 R |
| 2009/0023544 A1* | 1/2009 | Nitzpon ........................ | 475/338 |
| 2010/0062888 A1* | 3/2010 | Ciszak et al. ................. | 475/348 |
| 2011/0068583 A1* | 3/2011 | Burkart ......................... | 475/337 |
| 2011/0077120 A1* | 3/2011 | Dirk .............................. | 475/348 |

* cited by examiner

*Primary Examiner* — Jacob S Scott
(74) *Attorney, Agent, or Firm* — Galgano & Associates, PLLC; Thomas M. Galgano; Jessica G. Bower

(57) ABSTRACT

A gearbox for a wind turbine has a bearing arrangement positioned on the downwind side of a first stage planet carrier at a single locus. The planet carrier has a portion extending radially inwards and axially downwind from the planet gears. Thus, the weight of the gearbox is supported between the two theoretical support points of the pair of back to back tapered roller bearings at the downwind side of the first stage planet carrier. A member of unitary construction comprising gearbox flange, input shaft and first stage planet carrier, which can be cast as one piece, reduces the weight of this part compared to previous designs having separate components.

13 Claims, 5 Drawing Sheets

GEAR BOX, SEAL, AND COVER ARRANGEMENTS

FIELD OF THE INVENTION

Embodiments of the present invention relate to gear box arrangements. The present invention is particularly applicable, but in no way limited, to gear box arrangements in a wind turbine.

BACKGROUND TO THE INVENTION

Wind turbines are devices for converting wind power into electrical power and usually include a rotor, a gear box and a generator. In operation, wind causes the rotor to rotate and to provide a high torque, relatively low frequency input to the gear box. The gear box converts the high torque input from the rotor to a low torque, relatively high frequency output. The generator is connected to the output of the gear box and converts the rotational movement into electrical power.

Traditional connecting methods used between the hub (main shaft) and the gearbox include the application of bolts or shrink discs. For connections using bolts, the outer diameter of the connecting flange will affect the inner diameter of the up-wind bearings on the first stage planet carrier due to the assembling restraints. Therefore applications with simple and safe bolts system are limited. Currently shrink discs are more commonly used.

It would therefore be desirable to provide alternative gear box arrangements.

BRIEF DESCRIPTION OF PREFERRED EMBODIMENTS OF THE INVENTION

The present invention relates to a new internal bearing arrangement for a wind turbine gearbox which releases the constraints between the outer diameter of the connecting flange and the inner diameter of the planet carrier bearings. The new arrangement reduces the weight and cost of the bearings and the gearbox.

According to a first aspect of the invention, there is provided a gear box for a wind turbine generator according to claim 1. Preferably the gear box comprises: a flange, an input shaft, and a planetary gear set including one or more planet gears supported by a planet carrier, in which the input shaft, the flange and the planet carrier are of unitary construction and form a member having an input shaft region between a flange region and a planet carrier region, and in which the planet carrier region extends radially inwards and axially downwind from the planet gears.

Preferably, the member is an integrated unit.

Preferably the wind turbine gear box arrangement also includes a non-rotating support component, comprises a bearing arrangement located in a single locus along the longitudinal axis and arranged to provide support between the planet carrier region and the non-rotating support component, the gearbox having no further bearings on the integrated unit between the locus and the flange region.

Preferably, the single locus is at the radially and axially extending part of the planet carrier region.

Preferably, the bearing arrangement is arranged to at least partially restrict non-rotational movement between the integrated unit and the non-rotating support component. Preferably, the non-rotational movement is one or more of relative radial movement, relative axial movement, and relative tilt movement between the input shaft and the non-rotating component.

Preferably, the bearing arrangement comprises a double tapered roller bearing.

Preferably the wind turbine gear box arrangement also includes a cover arrangement having cover configured to detachably engage with the non-rotating support component so as to be disposed around the input shaft and over a substantial part of the planetary gear set, in which the cover is comprised of two or more parts to allow detachment for maintenance and/or inspection.

Preferably the cover has an outer peripheral region for engagement to the non-rotating support component, and an inner peripheral region for encircling the planet carrier region.

Preferably the wind turbine gear box arrangement also includes a sealing arrangement having a seal located between the cover and the non-rotating support component, which, in use prevents exchange of materials between an inside and an outside of the gearbox.

According to a second aspect of the invention, a member for connecting a wind turbine hub to a wind turbine gearbox is provided, the member has a unitary construction comprising an input shaft region between a flange region and a planet carrier region, and the planet carrier region extends axially downwind and radially inwards on a downwind side of the planet gears.

Preferably, the member is an integrated unit.

According to a third aspect of the invention, there is provided a cover arrangement for a wind turbine gearbox including a non-rotating support component and an integrated unit for connecting a wind turbine hub to a wind turbine gearbox, the cover arrangement comprising a cover configured to detachably engage with the non-rotating support component so as to be disposed around the input shaft and over a substantial part of the planetary gear set, in which the cover is comprised of two or more parts to allow detachment for maintenance and/or inspection.

BRIEF DESCRIPTION OF THE DRAWINGS

For a better understanding of various examples of embodiments of the present invention reference will now be made, by way of example only, to the accompanying drawings in which.

DETAILED DESCRIPTION OF VARIOUS EMBODIMENTS OF THE INVENTION

In the following description, the wording 'connect' and 'couple' and their derivatives mean operationally connected/coupled. It should be appreciated that any number or combination of intervening components can exist (including no intervening components). The term 'plurality' has the meaning one or more.

Figure 1:
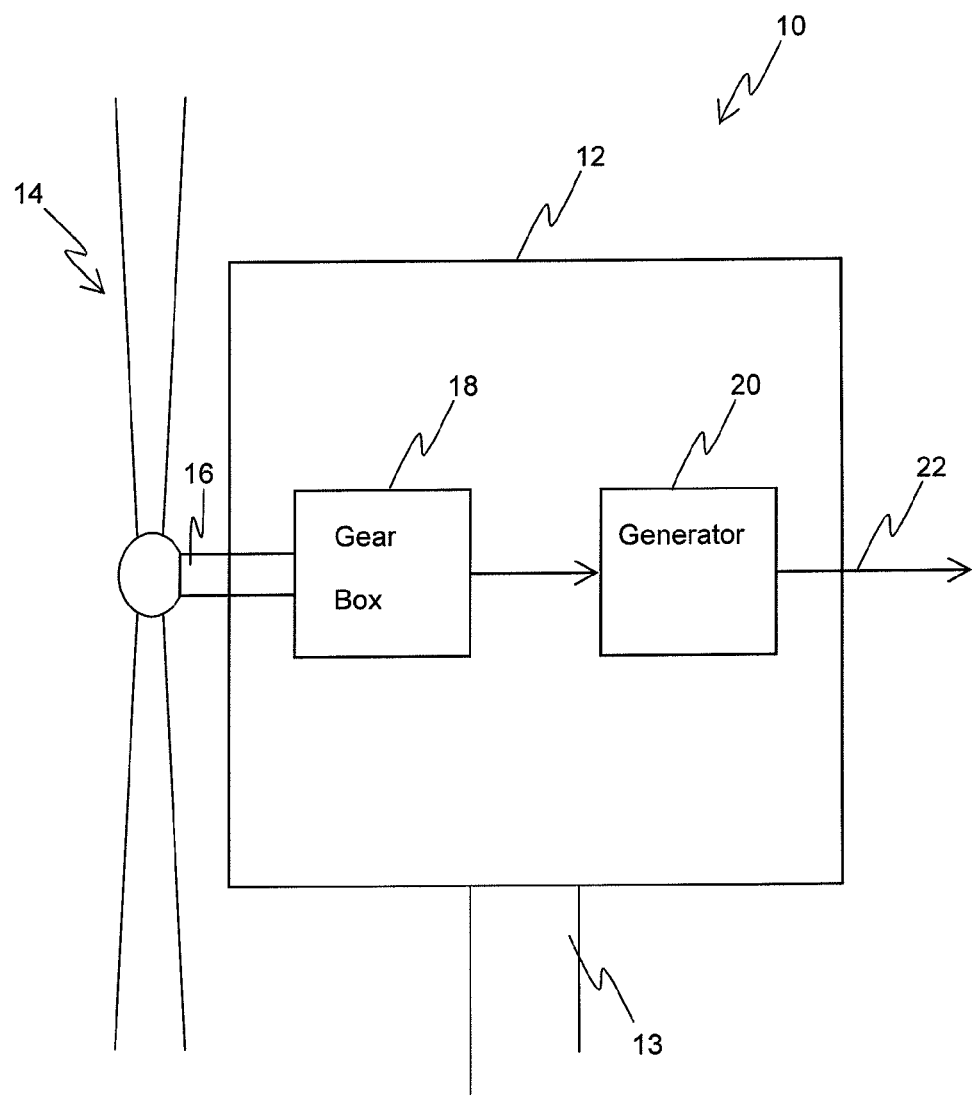
FIG. 1 illustrates a schematic diagram of a wind turbine according to various embodiments of the invention.

FIG. 1 illustrates a schematic diagram of a wind turbine 10 according to various embodiments of the invention. The wind turbine 10 includes a nacelle 12 (which may also be referred to as a turbine housing), a support post 13, a rotor 14, a rotor shaft 16, a gear box 18 and a generator 20. The wind turbine 10 is arranged to convert wind energy to electrical energy. The wind turbine 10 may be installed off-shore or may be installed inland.

In the following, the terms 'downwind' and 'upwind' refer to an axial direction in relation rotor 14, which is upwind of gearbox 18; gearbox 18 is downwind of rotor 14.

The nacelle 12 houses the gear box 18 and the generator 20 and protects them from environmental damage (e.g. caused by rain, snow etc). The support post 13 is connected to the nacelle 12 and to the earth (or to an anchored floating platform when located off-shore).

The rotor 14 is supported by the nacelle 12 and is arranged to rotate in response to the movement of air (wind) past the wind turbine 10. The gear box 18 is connected to the rotor 14 via the rotor shaft 16 and is connected to the nacelle 12. The gear box 18 is arranged to convert the relatively low angular frequency, high torque input from the rotor 14 to a relatively high angular frequency, low torque output. The generator 20 is mounted within the nacelle 12 and is configured to receive the output from the gear box 18 and convert the rotational movement into electrical energy 22.

Figure 2:
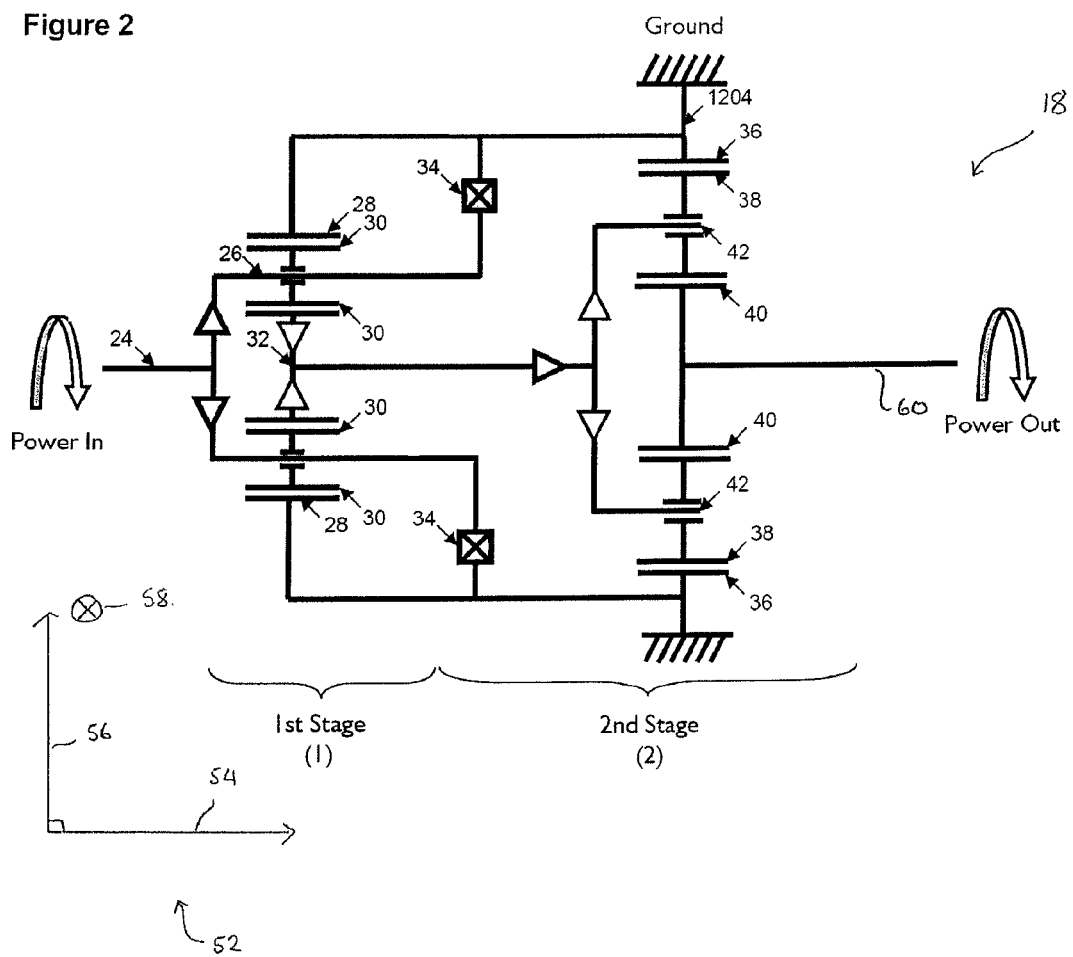
FIG. 2 illustrates a schematic diagram of a wind turbine gear box according to various embodiments of the invention.

FIG. 2 illustrates a schematic of a wind turbine gear box 18 according to various embodiments of the invention. The gear box 18 includes a first stage and a second stage. The first stage of the gear box 18 includes an input shaft 24 (comprising a planet carrier 26), a ring gear 28, a plurality of planet gears 30, a sun gear 32 and a bearing arrangement 34. The second stage of the gear box 18 includes a planet carrier 42, a plurality of planet gears 38, a sun gear 40, and a non-rotating support component 1204 including a ring gear 36.

FIG. 2 also illustrates a cylindrical co-ordinate system 52 that includes a longitudinal axis 54 (which may also be referred to as an axial axis), a radial axis 56 and an angular axis 58 (which may also be referred to as the azimuth). The gear box 18 defines a longitudinal axis 60 that extends through the centre of the gear box 18 and is parallel to the longitudinal axis 54 of the cylindrical co-ordinate system 52. The input shaft 24 is connected to the rotor shaft 16 (illustrated in FIG. 1) and is arranged to rotate about the longitudinal axis 60 in a direction substantially parallel with the angular axis 58. The input shaft 24 supports the non-rotating support component 1204 and the bearing arrangement 34. This feature will be described in more detail with reference to FIG. 3.

The plurality of first stage planet gears 30 are positioned within, and engage the first stage ring gear 28. The first stage ring gear 28 is a non-rotational component. The first stage planet carrier 26 is connected to the plurality of first stage planet gears 30 and is arranged to rotate the plurality of first stage planet gears 30 about the longitudinal axis 60 within the ring gear 28 in a direction substantially parallel with the angular axis 58. The first stage sun gear 32 is positioned within, and engages the plurality of first stage planet gears 30. The rotation of the plurality of first stage planet gears 30 causes the sun gear 32 to rotate about the longitudinal axis 60 in a direction substantially parallel with the angular axis 58.

The second stage ring gear 36 is a non-rotational component and is connected to non-rotating support component 1204. It can be torsionally coupled to the nacelle 12 of the wind turbine 10. The second stage planet carrier 42 is connected to the first stage sun gear 32 and is arranged to rotate about the longitudinal axis 60 in a direction substantially parallel with the angular axis 58. The plurality of second stage planet gears 38 are positioned within the second stage ring gear 36 and are connected to the second stage planet carrier 42. The plurality of second stage planet gears 38 rotate about the longitudinal axis 60. The second stage sun gear 40 is positioned within, and engages the plurality of second stage planet gears 38 and is arranged to rotate about the longitudinal axis 60 in a direction substantially parallel with the angular axis 58. The second stage sun gear 40 is connected to the output.

In operation, wind causes the rotor 14 and the rotor shaft 16 to rotate about the longitudinal axis 60. The rotation of the rotor shaft 16 causes the input shaft 24 (including the first stage planet carrier 26) to rotate and the input shaft 24 receives substantially all the torque/power from the rotor shaft 16.

Figure 3:
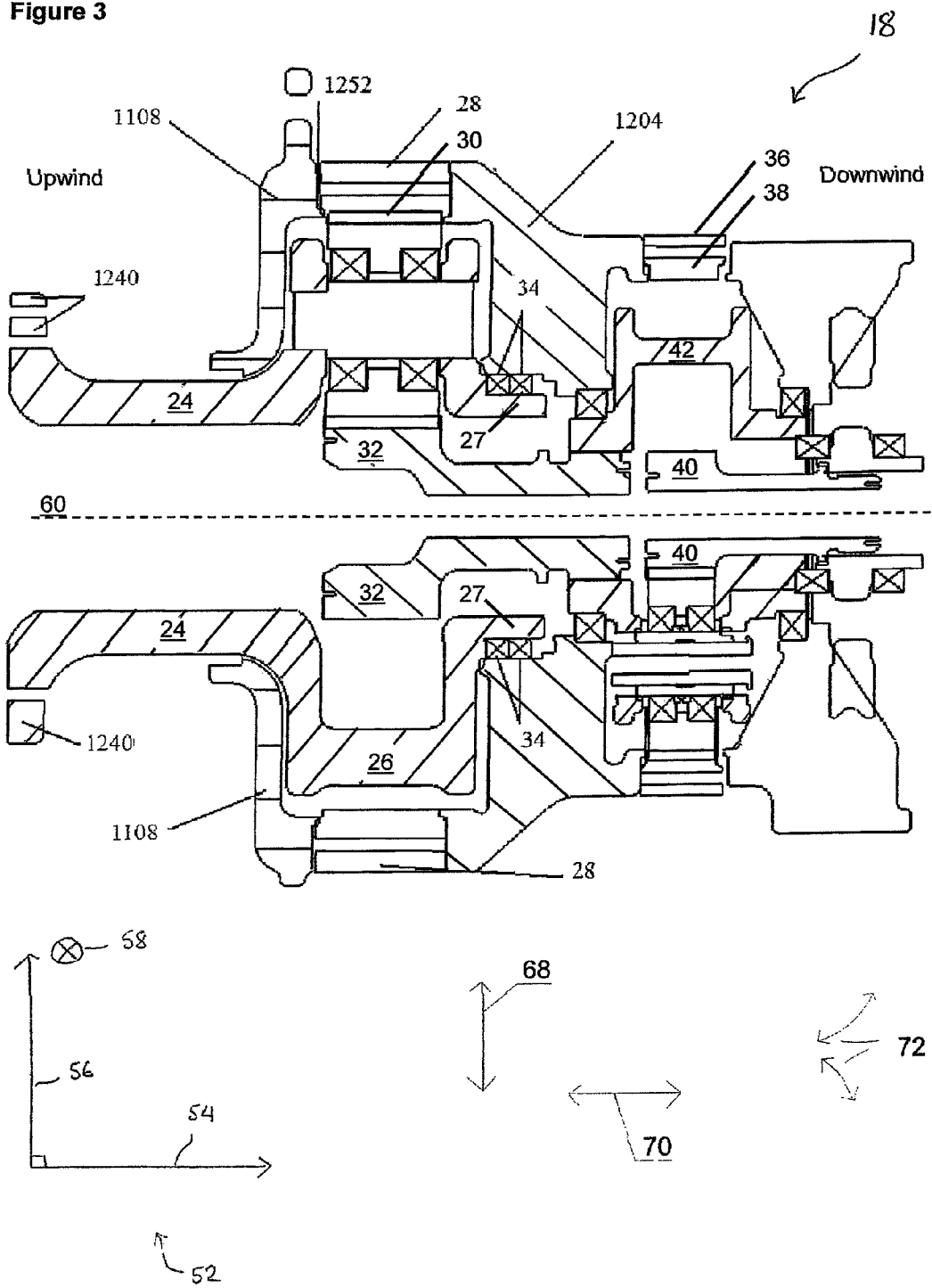
FIG. 3 illustrates a schematic cross sectional diagram of a wind turbine gear box according to various embodiments of the invention.

FIG. 3 illustrates a further schematic cross sectional diagram of the wind turbine gear box 18 and the cylindrical coordinate system 52. In FIG. 3, the non-rotating support component 1204, the input shaft 24 and the planet carrier 26 are illustrated in more detail.

In the example shown in FIG. 3, a bearing arrangement 34 is positioned on the downwind side of the first stage planet carrier 26 at a single locus as shown. Planet carrier 26 has a portion 27 extending radially inwards and axially downwind from the planet gears. This reduces the diameter, weight and cost of the bearing arrangement. The diameter, for example, can be less than the outer diameter of the input shaft. Bearings positioned on the upwind side of the first stage planet carrier 26 are not required. Bearing arrangement 34 can be, for example, a pair of bearings such as the tapered roller bearings as shown. Thus, the weight of the gearbox 18 lies between the two theoretical support points of the pair of back to back tapered roller bearings 34 at the down wind side of the first stage planet carrier 26. The support for the gearbox is more stable compared to the traditional arrangement with face to face bearings in which the weight of the gearbox lies on the extended line of the two theoretical support points. The absence of upwind bearings for the first stage planet carrier 26 means that the front cover 1108 is not subject to external forces. Therefore a horizontal-split thin cover can be used on the upwind side of the first stage ring gear 28. This arrangement can reduce the weight of the housing by about one ton compared to the traditional housing for the upwind bearings.

The bearing arrangement 34 is positioned between a region of housing 1204 and the planet carrier portion of a member including flange, input shaft and planet carrier regions, and which is of unitary construction. The bearing arrangement is positioned in a single region along the longitudinal axis 60. The bearing arrangement 34 may include one or more bearings that are positioned in the single region and may have an 'O' configuration. It should be appreciated from FIG. 3 that the wind turbine gear box 18 includes no additional bearings or bearing arrangements between the non-rotating support component 1204 and the flange portion 1240 at other positions or regions along the longitudinal axis 60.

The bearing arrangement 34 is arranged to at least partially restrict non-rotational movement between the planet carrier 26 and the non-rotating support component 1204. The bearing arrangement 34 may be arranged to restrict relative radial movement (indicated by the arrow 68), and/or relative axial movement (indicated by the arrow 70), and/or relative tilt movement (that is, movement that includes a radial and an axial component as indicated by arrows 72) between the planet carrier 26 and the non-rotating support component 1204.

The bearing arrangement 34 may comprise any suitable bearings that are able to restrict relative movement between the planet carrier 26 and the non-rotating support component 1204 as described above. The bearing arrangement 34 may include a double row tapered roller bearing for example.

Sealing 1252 traditionally between the housing 1204 and input shaft of the gearbox 24 can be positioned adjacent to the ring gear 28, minimising misalignment of the seal and further reducing the structural requirements for the front cover 1108. In use the seal 1252 prevents exchange of materials between inside and outside of the gearbox.

Figure 4:
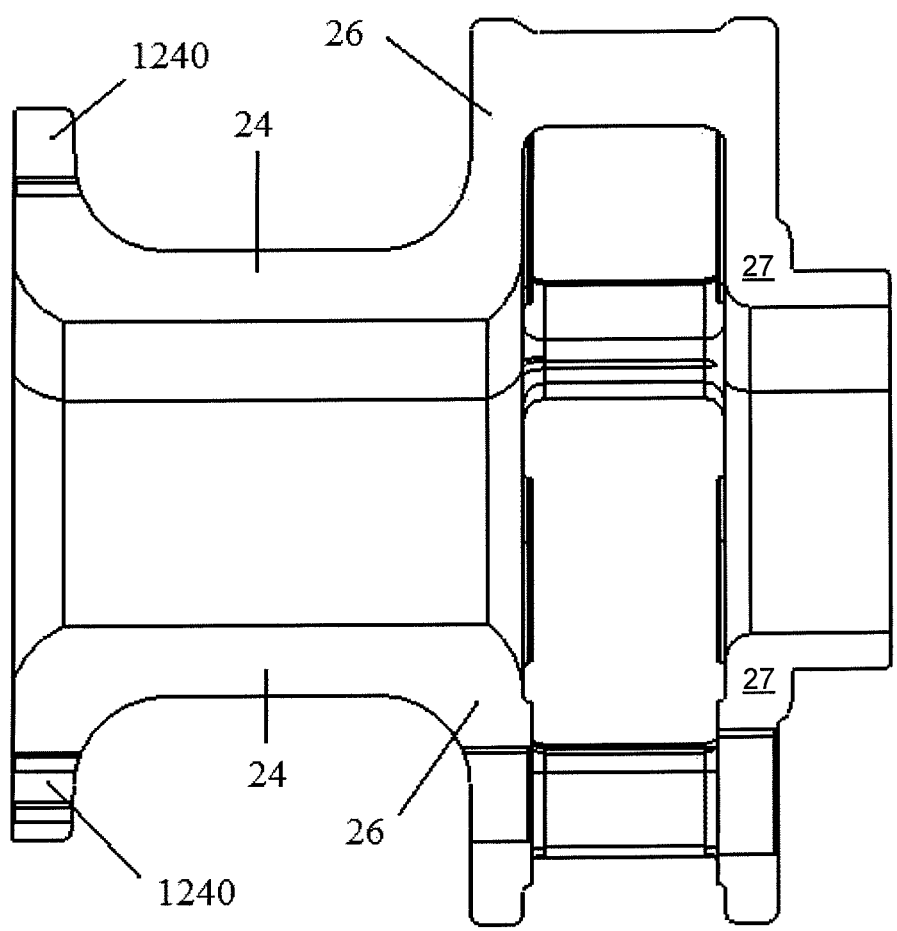
FIG. 4 illustrates an embodiment of the wind turbine gearbox integrated flange including an input shaft portion and a planet carrier portion.

FIG. 4 shows an integrated unit comprising gearbox flange 1240, input shaft 24 and first stage planet carrier 26. In a preferred embodiment this integrated unit can be cast as one piece, so that it is of unitary construction. This reduces the weight of this part, reduces the machining required of the connector and coupling, and eliminates difficulties aligning individual components. The dimension of the output side of the first stage planet carrier 26 is increased so that the stress level on this component is reduced. Therefore low cost cast iron can be used. Traditional gearbox first stage planet carriers use high-alloy cast steel.

Figure 5:
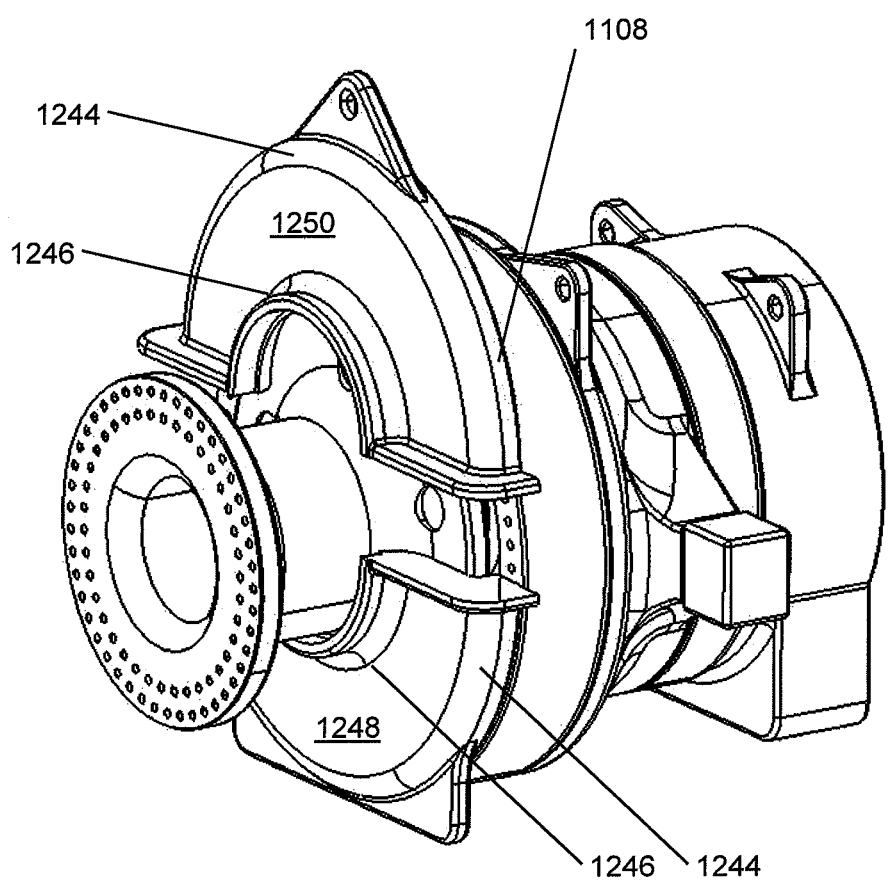
FIG. 5 illustrates an embodiment of the wind turbine gearbox front cover.

FIG. 5 shows a split thin cover 1108 deployed on the upwind side of the first stage ring gear 28. The cover arrangement comprises a cover 1108 detachably engaged with the non-rotating support component 1204. The cover is disposed around the input shaft 24 and over a substantial part of the planetary gear set. In use the cover 1108 may be removed to gain access to the planetary gear set for inspection and/or maintenance. The split in the cover is shown in FIG. 5 as being horizontal, but the split can be at any radial position.

As shown in FIG. 5, preferably, the cover 1108 has an outer peripheral region 1244 for engaging a periphery of the non-rotating support component 1204 and an inner peripheral region 1246 for encircling the first stage planet carrier. The cover 1108 can be fastened to the non-rotating support component by a plurality of bolts engaging the outer peripheral region of the cover 1244. The cover 1108 can be comprised of two or more parts. In FIG. 5, cover 1108 has two parts, 1248 and 1250, which allow the cover 1108 to be split for detachment to allow maintenance and/or inspection. The two or more parts of the cover are attached to the non-rotating support component 1204 by a plurality of bolts.

A first bearing arrangement according to various embodiments the present invention is provided. The first bearing arrangement is a double row tapered roller bearing having a first bearing row and a second bearing row. The first bearing row and the second bearing row are oriented so that they converge as they extend in a positive radial direction 56. It should be appreciated that the orientation of the first row and the second row includes a radial component and an axial component.

A second bearing arrangement according to various embodiments the present invention is provided. The second bearing arrangement is also a double row tapered roller bearing having a first bearing row and a second bearing row. The first bearing row and the second bearing row are oriented so that they diverge as they extend in a positive radial direction 56. It should be appreciated that the orientation of the first row and the second row includes a radial component and an axial component.

The first and second bearing arrangements provide an advantage in that they are able to restrict both radial and axial movement due to the orientation of the bearing rows. Consequently, the first and second bearing arrangements may both be able to provide support between the input shaft 24 and the non-rotating support component 62 and prevent them from moving relative to one another in the radial 68, axial 70 and tilt 72 directions.

Embodiments of the present invention provide several advantages. One such advantage is that since a single bearing arrangement may be used between the planet carrier 26 and the non-rotating support component 1204, the weight of the gear box 18 may be reduced. Furthermore, since bearings are relatively expensive components, the above described arrangement may reduce the cost of the gear box.

As illustrated in FIG. 3, the input shaft 24 supports the non-rotating component 1204 via the bearing arrangement 34, the gear box 18 does not require any further supporting structure between the input shaft 24 and the non-rotating component 62. This may advantageously reduce the weight and diameter of the gear box 18 and may also reduce the cost of the gear box 18 (as less material such as metal is used to manufacture the gear box 18).

Although embodiments of the present invention have been described in the preceding paragraphs with reference to various examples, it should be appreciated that modifications to the examples given can be made without departing from the scope of the invention as claimed.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

For example, as illustrated in FIG. 3, input shaft portion 24 extends axially downwind as far as portion 27 on the downwind side of planet gears 30 and is in contact with bearing arrangement 34. The input shaft 24 thus supports the non-rotating support component 1204 and the bearing arrangement 34 at a point axially downwind of the planet gears. A radially outward extending surface of portion 27 is in contact with bearing arrangement 34. The input shaft 24 thus comprises flange 1240, the region of the input shaft upwind of the planetary gear set shown by numeral 24 in FIG. 3, the portion of the input shaft 26 surrounding the planetary gear set, and a further portion 27, downwind of the planetary gear set, wherein an outer surface of portion 27 supports the non-rotating support component 1204 and the bearing arrangement 34 at a point radially inward of the planet gears. As illustrated in FIG. 3, the diameter of the radially outward surface of portion 27 can be less than the radially outer surface of the input shaft 24. It is advantageous that the diameter of the region 27 is substantially similar to that of the diameter of the portion of the input shaft 24 upwind of the planetary gear set.

The invention claimed is:

1. A gear box for a wind turbine generator, comprising:
a flange;
an input shaft; and
a planetary gear set comprising at least one planet gear supported by a planet carrier,
wherein said input shaft, said flange and said planet carrier are a one-piece integrated unit and form a member having an input shaft region between a flange region and a planet carrier region, and wherein said planet carrier region extends radially inwards and axially downwind from said planet gears.

2. The gearbox of claim 1, further comprising:
a non-rotating support component, wherein said non-rotating support component comprises a bearing arrangement located in a single locus along the longitudinal axis and arranged to provide support between said planet carrier region and said non-rotating support component, said gearbox having no further bearings on said member between said locus and said flange region.

3. The gearbox of claim 2, wherein:
said single locus is at the radially and axially extended part of said planet carrier region.

4. The gearbox of claim 2, wherein:
said bearing arrangement is arranged to at least partially restrict non-rotational movement between said member and said non-rotating support component.

5. The gearbox of claim 4, wherein:
said non-rotational movement is at least one of relative radial movement, relative axial movement, and relative tilt movement between said input shaft and said non-rotating component.

6. The gearbox of claim 2, wherein:
said bearing arrangement comprises a double tapered roller bearing.

7. The gearbox of claim 2, additionally comprising:
a cover arrangement, comprising:
a cover configured to detachably engage with said non-rotating support component so as to be disposed around said input shaft and over a substantial part of said planetary gear set,
wherein said cover is comprised of at least two parts to allow detachment for a member selected from the group consisting of maintenance and inspection.

8. The gearbox of claim 7, wherein:
said cover has an outer peripheral region for engagement to said non-rotating support component.

9. The gearbox of claim 7, wherein:
said cover has an inner peripheral region for encircling said planet carrier region.

10. The gearbox of claim 7, further comprising:
a sealing arrangement, comprising:
a seal located between said cover and said non-rotating support component, which, in use prevents exchange of materials between an inside and an outside of said gearbox.

11. A wind turbine, comprising:
a gearbox for a wind turbine generator comprising a flange; an input shaft; and a planetary gear set including at least one planet gear supported by a planet carrier, wherein said input shaft, said flange and said planet carrier are a one-piece integrated unit and form a member having an input shaft region between a flange region and a planet carrier region, and wherein said planet carrier region extends radially inwards and axially downwind from said planet gears; and
a non-rotating support component, wherein said non-rotating support component comprises a bearing arrangement located in a single locus along the longitudinal axis and arranged to provide support between said planet carrier region and said non-rotating support component, said gearbox having no further bearings on said member between said locus and said flange region.

12. The wind turbine according to claim 11, further comprising:
a cover arrangement, comprising:
a cover configured to detachably engage with said non-rotating support component so as to be disposed around said input shaft and over a substantial part of said planetary gear set,
wherein said cover is comprised of at least two parts to allow detachment for a member selected from the group consisting of maintenance and inspection.

13. The wind turbine according to claim 12, further comprising:
a sealing arrangement, comprising:
a seal located between said cover and said non-rotating support component, which, in use prevents exchange of materials between an inside and an outside of the gearbox.

* * * * *